United States Patent
Gavrilets et al.

(12)

(10) Patent No.: US 10,677,933 B1
(45) Date of Patent: Jun. 9, 2020

(54) HEADING OR PITCH DETERMINATION SYSTEMS AND METHODS WITH HIGH CONFIDENCE ERROR BOUNDS

(71) Applicant: Rockwell Collins, Inc., Cedar Rapids, IA (US)

(72) Inventors: Vladislav Gavrilets, McLean, VA (US); Huan T. Phan, Cedar Rapids, IA (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 166 days.

(21) Appl. No.: 15/673,273

(22) Filed: Aug. 9, 2017

(51) Int. Cl.
*G01S 19/53* (2010.01)
*G01S 19/33* (2010.01)
*G01C 23/00* (2006.01)
*B64D 43/00* (2006.01)
*G01S 19/36* (2010.01)

(52) U.S. Cl.
CPC .............. *G01S 19/53* (2013.01); *B64D 43/00* (2013.01); *G01C 23/005* (2013.01); *G01S 19/33* (2013.01); *G01S 19/36* (2013.01)

(58) Field of Classification Search
None
See application file for complete search history.

(56) References Cited

U.S. PATENT DOCUMENTS

| 2013/0050020 | A1* | 2/2013 | Peck | G01S 19/15 342/357.27 |
| 2013/0069822 | A1* | 3/2013 | Wu | G01S 19/49 342/357.24 |
| 2016/0320190 | A1* | 11/2016 | Wu | G01C 21/165 |

OTHER PUBLICATIONS

Wu et al.; "Geometry Extra-Redundant Almost Fixed Solutions: A High Integrity Approach for Carrier Phase Ambiguity Resolution for High Accuracy Relative Navigation"; 2008 IEEE; 1-4244-1537-3/08; 15 pages.

* cited by examiner

*Primary Examiner* — Jonathan M Dager
*Assistant Examiner* — Garrett F Evans
(74) *Attorney, Agent, or Firm* — Donna P. Suchy

(57) ABSTRACT

Systems and methods for use in navigating aircraft are provided. The systems can use Geometry Redundant Almost Fixed Solutions (GRAFS) or Geometry Extra Redundant Almost Fixed Solutions (GERAFS) to compute high confidence error bounds for a heading angle estimate or pitch angle derived using signals received on at least two antennas.

19 Claims, 3 Drawing Sheets

US 10,677,933 B1

HEADING OR PITCH DETERMINATION SYSTEMS AND METHODS WITH HIGH CONFIDENCE ERROR BOUNDS

BACKGROUND

Embodiments of inventive concepts disclosed herein relate to the field of heading or pitch determination for vehicles. More particularly, embodiments of inventive concepts disclosed herein relate to systems and methods of providing enhanced integrity for global navigation satellite system (GNSS) derived attitude parameters including but not limited to heading angle and pitch angle.

A heading angle estimate is used in vehicular applications to predict hazards, provide direction, and control the vehicle. For example, an aircraft heading angle estimate in passenger-carrying, civil certified aircraft is generally provided by an inertial reference system (IRS), a gyrocompassing attitude and heading reference system (gyrocompassing AHRS), a directional gyro (DG) AHRS, an AHRS with a magnetically referenced heading, or combinations thereof. The IRS and gyrocompassing AHRS provide very accurate heading angle estimates (the specification can be 0.4 degrees, 95%). When redundant IRS or gyrocompassing AHRS are used, these systems provide high accuracy/high integrity heading angle estimate, sufficient for such applications as head-up display (HUD) approach guidance. However, IRS and gyrocompassing AHRS are expensive.

Magnetically referenced heading measurement is much less accurate (the specification can be 2 degrees, 95% in wings level non-accelerating flight, where magnetic declination is below 70 degrees). This accuracy is not sufficient for HUD approach guidance. Magnetometers are also subject to magnetic field disturbances, which could cause large heading errors. Such disturbances could be caused by aircraft equipment, or by ferrous elements in the runway, for example.

DG function of an AHRS is typically used with a magnetically referenced AHRS, when magnetic field measurement is known to be or detected as inaccurate. In this case heading accuracy from DG AHRS can be no better than magnetic heading accuracy and it degrades with time based on DG drift rate. Safety objectives for heading indications on Part 25 aircraft are provided in FAA AC 25-11B. See Section 4.7.4.4 of AC 25-11B. Accordingly, there is a need for a low cost heading estimator that has sufficient accuracy and integrity for HUD approach guidance and other aircraft operations.

SUMMARY

In one aspect, embodiments of the inventive concepts disclosed herein are directed to a method determining a pitch angle or heading angle. The method includes receiving satellite signals on antennas at known positions on a vehicle and determining a vector connecting positions of the two or more antennas using the satellites signals according to Geometry Redundant Almost Fixed Solutions (GRAFS) or Geometry Extra Redundant Almost Fixed Solutions (GERAFS) to enhance integrity. The method also includes determining the pitch angle or the heading angle using the vector.

In a further aspect, embodiments of the inventive concepts disclosed herein are directed to a method determining a pitch angle or heading angle. The method includes receiving satellite signals on antennas at known positions on a vehicle and determining a vector connecting positions of the two or more antennas according to Geometry Redundant Almost Fixed Solutions (GRAFS) or Geometry Extra Redundant Almost Fixed Solutions (GERAFS) to compute high confidence error bounds. The method also includes determining the pitch angle or the heading angle using the vector.

In a further aspect, embodiments of the inventive concepts disclosed herein are directed to a heading or pitch determination system with enhanced integrity. The heading or pitch determination system includes a global navigation satellite receiver system comprising a plurality of antennas at known locations on a vehicle, and an electronic processor associated with an attitude heading reference unit or the global navigation satellite receiver system. The electronic processor is configured to determine a vehicle heading angle or pitch angle. The electronic processor is configured to determine a vector associated with the antennas using Geometry Redundant Almost Fixed Solutions (GRAFS) or Geometry Extra Redundant Almost Fixed Solutions (GERAFS) to enhance integrity and to determine the pitch angle or the heading angle using the vector.

In a further aspect, embodiments of the inventive concepts disclosed herein are directed to a one or more computer-readable storage media having instructions stored thereon. The instructions are executable by one or more processors of an aircraft to: receive satellite signals on antennas at known positions on a vehicle; determine a vector associated with antenna positions of the antennas using the satellites signals according to Geometry Redundant Almost Fixed Solutions (GRAFS) or Geometry Extra Redundant Almost Fixed Solutions (GERAFS) solutions to enhance integrity; and determine a pitch angle or a heading angle using vector.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or maybe represented schematically in the interest of clarity. Like reference numerals in the drawings may represent and refer to the same or similar element, feature, or function. In the drawings.

DETAILED DESCRIPTION

Before turning to the figures, which illustrate exemplary embodiments of the inventive concepts disclosed herein in detail, it should be understood that the inventive concepts disclosed herein are not limited to the details or methodology set forth in the description or illustrated in the figures. It should also be understood that the terminology is for the purpose of description only and should not be regarded as limiting.

Referring generally to the figures, systems and methods for vehicles (e.g., manned or unmanned aircraft) use a dual-antenna Global Navigation Satellite System (GNSS) heading determination system. In some embodiments, the systems and methods use a single GNSS receiver with dual RF front ends or a pair of GNSS receivers and are configured to measure carrier phase and pseudo-range signals on one or more frequencies, for one or more satellite constellations, at the same time. The systems and method determine a heading angle or elevation angle connecting two antennas using these measurements. In some embodiments, double differenced carrier phase observables are formed, which contain an integer ambiguity. These integer ambiguities are determined or resolved using carrier-smoothed double-differenced pseudo-range measurements in some embodiments. Geometry Redundant Almost Fixed Solutions (GRAFS) enhance the integrity of a dual-antenna GNSS heading or elevation determination, or a Geometry Extra Redundant Almost Fixed Solutions (GERAFS) enhance integrity of a multiple (more than two) antenna GNSS heading or heading determination system.

It should be noted that the term vehicle includes aircraft which as utilized herein may include any manned or unmanned object capable of flight. Examples of aircraft may include, but are not limited to, fixed-wing aerial vehicles (e.g., propeller-powered or jet-powered), rotary-wing aerial vehicles (e.g., helicopters), and manned aircraft, unmanned aircraft (e.g., unmanned aerial vehicles, or UAVs). Additionally, the term vehicles includes ground-based vehicles and/or water-based vehicles, and as utilized herein, may refer to any type of vehicles (e.g., manned or unmanned) or other objects capable of traveling on ground, terrain and/or water, respectively, such as cars, ships, trucks, buses, or trains.

Figure 1:
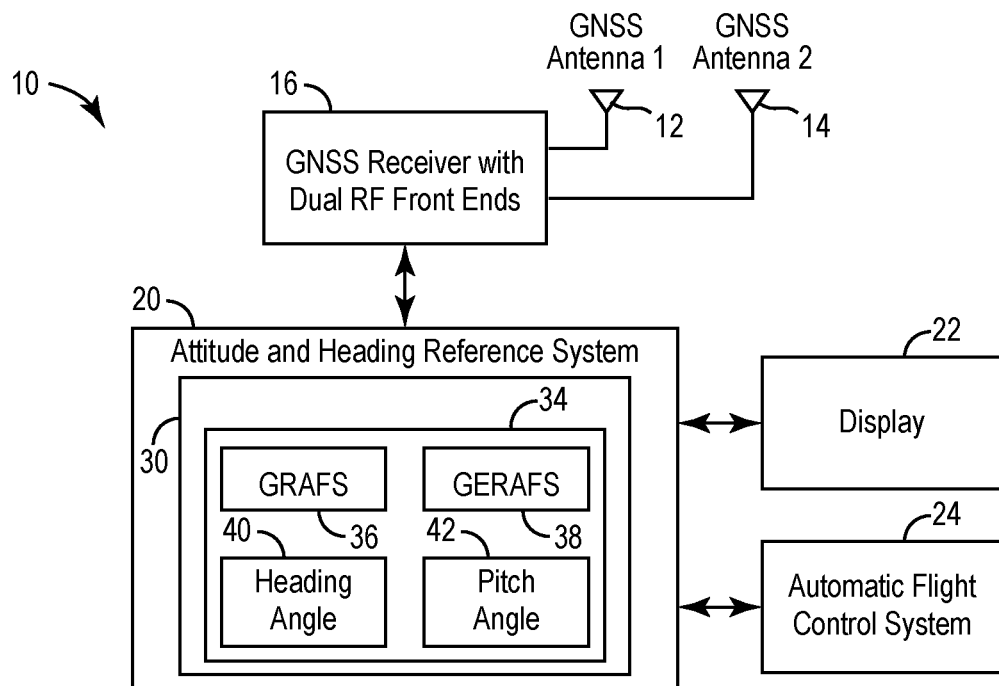
FIG. 1 is a schematic block diagram of a heading determination system including two or more antennas according to exemplary aspects of the inventive concepts disclosed herein.

Referring now to FIG. 1, a block diagram of a system 10 for providing attitude and heading information for a vehicle (e.g., aircraft or other vehicle) includes an antenna 12, an antenna 14, a GNSS receiver 16, and an AHRS 20). The system 10 can be used with at least one display 22 and an automatic control system 24 (e.g., an automatic flight control system). The system 10 is configured to provide a high accuracy, high integrity (e.g., high confidence error bounded) heading and/or pitch angle parameters using signals received on the antenna 12 and the antenna 14 which may be GNSS antennas (e.g., Global Positioning System (GPS) antennas). The parameters are determined by the AHRS 20 or the GNSS receiver 16 and provided on the display 22 or used by the automatic control system 24 for controlling the vehicle.

The GNSS receiver 16 is a receiver (e.g., GPS, Global Navigation Satellite System (GLONASS), Galileo, or Beidou receiver) with dual RF front ends for the antennas 12 and 14 or a dual receiver architecture (e.g., two receivers, one for each of the antenna 12 and the antenna 14). The GNSS receiver 16 can be GPS only, or can be a multiconstellation receiver (e.g., a combination of two or more of GPS, GLONASS, Galileo, and Beidou receivers). The antennas 12 and 14 are situated on the vehicle at two different known locations (e.g., separated by a baseline length). The baseline length and the relative locations of the antennas 12 and 14 in a frame of reference fixed to the aircraft (e.g. builders frame or body frame) can be accurately measured at installation or derived from aircraft drawings. The GNSS receiver 16 is configured to measure carrier phase and pseudo-range signals on one or more frequencies, for one or more satellite constellations, at the same time. In some embodiments, the GNSS receiver 16 or the AHRS 20 is configured to determine a heading angle or pitch angle using these measurements associated with the antennas 12 and 14 and known positions (e.g., the relative positions) of the antennas 12 and 14.

In some embodiments, double differenced carrier phase observables are formed, which contain an integer ambiguity. These integer ambiguities are determined or resolved using carrier-smoothed double-differenced pseudo-range measurements in some embodiments. A dual-antenna GNSS heading determination system can achieve excellent accuracy (e.g. 0.5 deg 95% for 2 meter baseline) in some embodiments. The GNSS receiver 16 can also track signals on multiple frequencies, and form combinations of observables (e.g. widelane and narrowlane combinations) to facilitate an ambiguity search. The system 10 uses any number of GNSS antennas higher than 1. A larger number of antennas can create additional geometric redundancy, and enable tighter bounds on the heading error, or higher confidence for a given bound in some embodiments.

The system 10 is configured to apply Geometry Redundant Almost Fixed Solutions (GRAFS) to enhance integrity of a two antenna system or Geometry Extra Redundant Almost Fixed Solutions (GERAFS) to enhance integrity of a multiple (more than two) antenna system in some embodiments. The GRAFS or GERAFS is implemented using a processing circuit 30 including a memory 34 storing a GRAFS module 36 and/or a GERAFS module 38. The processing circuit 30 can be part of the GNSS receiver 16, the AHRS 20, and/or other equipment (e.g., a HUD computer) in some embodiments. The GERAFS or GRAFS are used to provide high confidence error bounds on the heading or pitch measurement, derived using two or more GNSS antennas (e.g., antennas 12 and 14). The system 10 also includes a heading calculation module 40 and a pitch calculation module 42 stored in the memory 34 for determining heading and pitch values and associated integrity checks in response to the estimated vector connecting the antennas 12 and 14 and the known distance between the antennas 12 and 14 as described herein. The heading calculation module 40 and the pitch calculation module 42 are hosted on the GNSS receiver 16, the AHRS 20 and/or other equipment (e.g., a HUD computer) in some embodiments.

The AHRS 20 is a computing system for determining attitude information such as heading, pitch (elevation), and roll. The AHRS 20 is in communication with the GNSS receiver 16, the display 22, the automatic control system 24 for receiving and providing data. The AHRS 20 includes sensors (e.g., solid-state or microelectromechanical systems (MEMS) gyroscopes, accelerometers and magnetometers) in three axes for providing parameters for determining attitude information.

The display 22 is a flight display in some embodiments. The display 22 is a CRT, LCD, or other display for providing information to a user, such as a pilot. For example, display 22 can be a helmet mounted display (HMD), a head up display (HUD), a head down display (HDD), or another type of display device. In some embodiments, the system 10 could be used to provide heading reference to a HUD or HMD computer for display of approach guidance on a HUD or HMD combiner. In some embodiments, the heading angle is used to provide HUD drift angle guidance. In some embodiments, the drift angle guidance is provided if the protection level is not exceeded.

The automatic control system 24 is a computing system for controlling travel of the vehicle (e.g., flight of the aircraft) and includes servomechanisms to control operation of the vehicle (e.g., to move control surfaces of an aircraft, such as elevators, rudders, and ailerons). The automated control system 24 can utilize operator inputs, travel plans (e.g., a flight plan), flight parameters form sensors and the AHRS 20 to control the vehicle (e.g., control velocity, direction, altitude, etc.). The automatic control system 24 can be an automatic flight control system 24 including an autopilot system in some embodiments.

The processing circuit 30 includes at least one processor, which may be any type of general purpose or special purpose processor (e.g., FPGA, CPLD, ASIC, etc.), and at least one memory 34, which may be any type of computer or machine-readable storage medium (e.g., ROM, RAM, hard disk, flash memory, etc.). The processing circuit 30 may be paired with or a component of a communication link, such as via a networking interface (e.g., Ethernet).

The memory 34 may include one or more modules including instructions that may be executed by processing circuit 30 to perform various processing functions for the system 10. For example, the memory 34 includes software instructions for the heading calculation module 40, and the pitch calculation module 42, the GERAFS module 38 and the GRAFS module 36 in some embodiments.

The GRAFS or GERAFS modules 36 and 38 provide an estimate of probability that the baseline vector estimate is almost fixed, under certain assumptions about error models. The baseline solution is defined to be almost fixed if none of the double differenced integer ambiguity estimates are off by more than one wavelength in some embodiments. Alternatively, for a given probability that the solution is almost fixed, the GRAFS or GERAFS modules 36 and 38 provide a lateral protection level for the resulting baseline solution.

The GERAFS algorithm was developed for high integrity/high accuracy relative navigation, such as precision approach guidance for a carrier landing and is described in "Geometry Extra-Redundant Almost Fixed Solutions: A High Integrity Approach for Carrier Phase Ambiguity Resolution for High Accuracy Relative Navigation." S. Wu, S. Peck, R. Fries, G. McGraw. IEEE/ION Position, Location and Navigation System, May 2008. According to one integrity example, a single frequency operation, with L1 wavelength of 0.19 meters and a lateral dilution of precision (LDOP) of 1.5 would yield very high availability, likely greater than 99.9%, with a modern GPS constellation. If all double differenced ambiguities are off by no more than one wavelength, then the total error heading error can be bounded by the following approximate equation:

$$THPL \sim (LDOP\ W\_L1)/BL*57.3$$

Where
THPL—true heading protection level, in degrees
LDOP—lateral dilution of precision
W_L1=0.19 meters, GPS L1 wavelength
BL—baseline length, meters.

Figure 2:
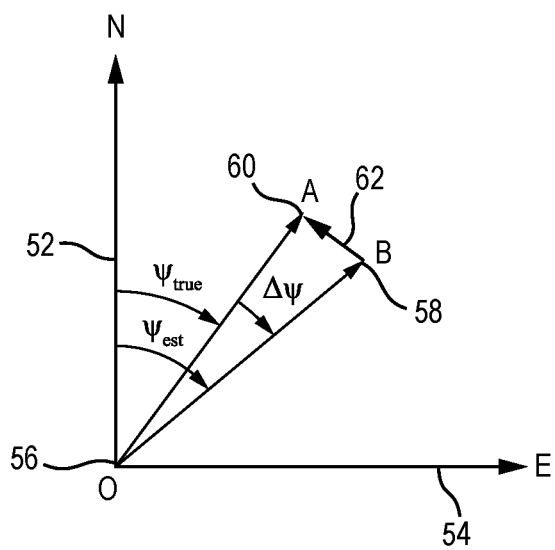
FIG. 2 is schematic drawing of a heading estimate provided by the position system illustrated in FIG. 1 according to exemplary aspects of the inventive concepts disclosed herein.

With reference to FIG. 2, a heading determination by the system 10 is represented on a local level (North-East) coordinate frame with an Y axis 52 representing a direction towards the North and an X axis 54 representing a direction towards the East. An origin 56 is provided at the intersection of the X axis 54 and the Y axis 52. The origin 56 is at the center of the rear GNSS antenna (e.g., the antenna 12) mounted on top of the aircraft fuselage (denoted O). The second antenna (e.g., antenna 14) is mounted on the fuselage ahead of the rear antenna, such that a true vector 60 (OA) connecting the two antennas is parallel to the aircraft body axis. The true vector 60 connecting the two antennas 12 and 14 does not have to be parallel to the aircraft body axis in some embodiments. Rather its orientation with respect to the aircraft body frame can be measured, and the aircraft heading can be determined from the orientation of the true vector 60 connecting the two antennas 12 and 14.

An estimated vector 58 (OB) depicts an estimation of the true vector 60 connecting the two antennas on the local level frame using the satellite signals. Heading angle error is represented by a vector 62 (AB) between the true vector 60 and the estimated vector 58.

The system 10 uses the GRAFS or GERAFS modules 36 and 38 to enable computation of a very high confidence upper bound on the lateral error, shown in FIG. 2 by the length of a vector 62 (the difference between A and B). Dividing this upper bound by the horizontal projection of the true vector 60, a high confidence upper bound on the heading error is obtained. The horizontal projection of the true vector 60 can be estimated very accurately using pitch and roll angles provided by the AHRS 20. The pitch and roll angles are determined with high accuracy by the AHRS 20, and the distance (base line length) between the antennas 12 and 14 can be measured very precisely.

Figure 3:
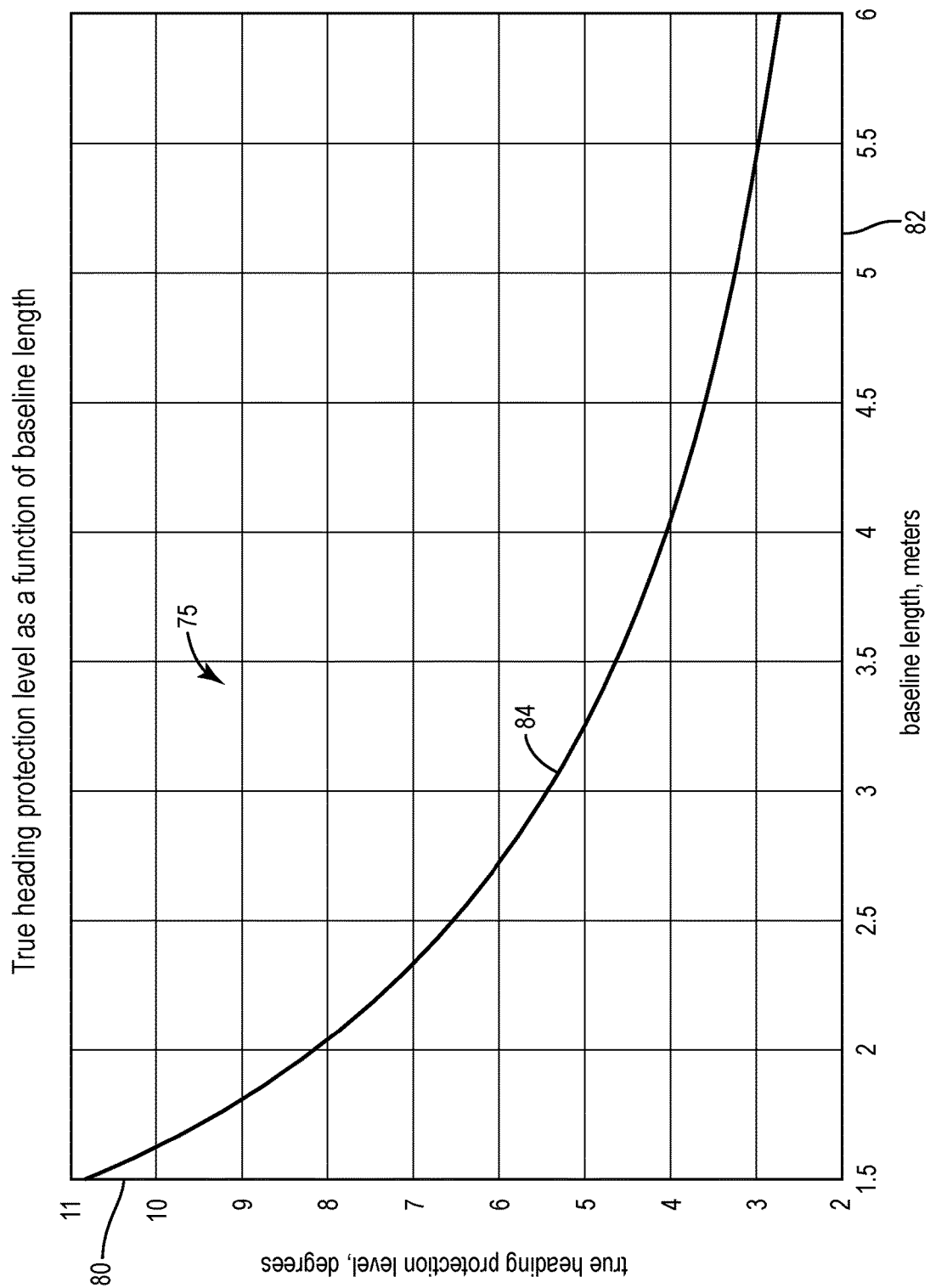
FIG. 3 is a graph showing a relationship between true heading protection level and baseline length for the position system illustrated in FIG. 1 according to exemplary aspects of the inventive concepts disclosed herein.

With reference to FIG. 3, a graph 75 of the true heading protection level as a function of baseline length is represented. A Y axis 80 represents true heading protection level in degrees and an X axis 82 represents base line length in meters. A curve 84 shows lower protection levels for longer base line lengths. The GRAFS or GERAFS modules 36 and 38 provide a protection level for an instantaneous solution. Additional techniques could be used in conjunction with GRAFS or GERAFS modules 36 and 38 to achieve higher level of confidence in a given error bound or a tighter bound on the heading error at a given confidence level. Several examples of such techniques include but are not limited to ambiguity monitoring, comparing rate of change of the GNSS computed heading form the GNSS receiver 16 with the heading rate computed by AHRS 20 or an IRS, checking consistency of the estimated baseline length with the measured baseline length (i.e. known distance between the antennas 12 and 14), and checking consistency of the vertical component of the baseline solution with an attitude estimate independently obtained from the AHRS 20 or an IRS. The ambiguity monitoring involves checking for sudden changes in the values of resolved ambiguities. In general, ambiguities should be constant unless there is a cycle slip in a receiver carrier phase tracking loop. Frequent changes in ambiguity estimates indicate that the baseline solution may not be reliable.

In some embodiments, a heading drift check is performed by heading calculation module 40. If the heading drift bound from a directional gyro is small enough, heading change between dual-antenna GNSS heading solutions corresponding to two different times is compared, and the heading change is computed as an integrated heading rate from the directional gyro over the same period of time. This heading change check over a sliding time window can be continuously applied to provide an additional means of detecting a hazardously erroneous GNSS heading estimate in some embodiments. In some embodiments, a baseline length (i.e. known distance between the antennas 12 and 14) check is used either as a constraint during ambiguity resolution procedure, or as an independent cross check.

Figure 4:
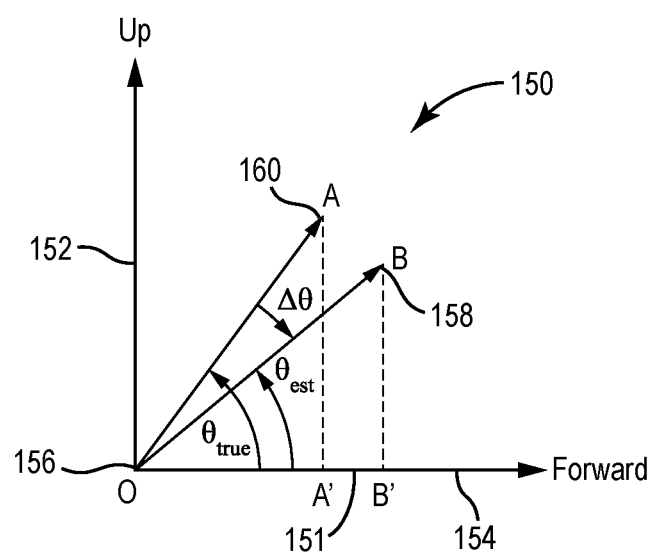
FIG. 4 is schematic drawing of a an pitch angle estimate provided by the attitude determination system illustrated in FIG. 1 according to exemplary aspects of the inventive concepts disclosed herein.

With reference to FIG. 4, the system 10 computes an estimate of elevation angle or aircraft pitch angle by computing an arcsine of the ratio of the vertical component of the an estimated vector 158 (OB) to a length 151 (OB') of a baseline using the pitch calculation module 42. The elevation or pitch angle determination by the system 10 is represented on a Y axis 152 representing an upward direction with respect to ground and an X axis 154 representing a forward direction. An origin 156 (O) is provided at the intersection of the X axis 154 and the Y axis 152. In some embodiments, the computation of the aircraft pitch angle uses two GNSS antennas (e.g., the antennas 12 and 14). The rear GNSS antenna is depicted by O, and a true location of the front antenna with respect to the rear antenna is depicted by a true vector 160 (OA). An estimated location of the front antenna with respect to the rear antenna is depicted by the estimated vector 158. The dual antenna method yields projections of the estimated vector 158 (OB) on the axes 152 and 154 of the selected frame of reference, for example the local level frame in some embodiments. The true vector 160 represents the actual pitch angle. The projection of the estimated vector 158 on the local vertical is depicted by the length 151 (BB'). The resulting dual antenna GNSS pitch angle estimate is given by $$\theta\_est = ARCSINE(BB'/L)$$

where L is the measured distance between the two antennas 12 and 14 and BB' is the length 151.

An independent estimate of the true pitch angle can be provided by the AHRS 20. In one embodiment, the AHRS pitch angle error is bounded by ±3 degrees with very high confidence (e.g. 99.999%) and the measured baseline length (OA') is 2.3 meters (L=2.3 meters). The vertical component of the baseline vector can be constrained within ±2.3*3/57.3=±0.12 meters. This data is used to narrow the search during the ambiguity resolution procedure, or as an independent cross-check on the GNSS baseline solution. In this example, the true vector 160 connecting the two antennas 12 and 14 is parallel to the aircraft X body axis. If antennas are mounted differently, this check can be adjusted accordingly. The estimate of aircraft pitch angle is compared with an independent estimate provided by the AHRS 20 or an IRS. This information can also be used either during the ambiguity resolution process, or as an independent cross-check on the baseline solution.

Various avionics applications benefit greatly from a high integrity multi-GNSS antenna heading determination of the system 10 according to some embodiments. Helicopters are frequently operated in an environment where magnetic heading reference is unusable and therefore, can benefit from the system 10. Regional airliners frequently do not have an IRS or a gyrocompassing AHRS and therefore, can benefit from the system 10. Any vertical takeoff and landing aircraft (beyond helicopters) intended for operation in an environment without an adequate magnetic field can benefit from the system 10.

The inventive concepts disclosed herein are described above with reference to drawings. These drawings illustrate certain details of specific embodiments that implement the systems and methods and programs of the present disclosure. However, describing the inventive concepts with drawings should not be construed as imposing on the inventive concepts disclosed herein any limitations that may be present in the drawings. Embodiments of the inventive concepts disclosed herein contemplate methods, systems and program products on any machine-readable media for accomplishing its operations. Embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments of the inventive concepts disclosed herein include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A heading or pitch determination system with enhanced integrity, comprising:
    a global navigation satellite receiver system comprising a plurality of antennas at known locations on a vehicle; and
    an electronic processor associated with at least one of an attitude heading reference unit, a flight control system, or a head up display computer, and the global navigation satellite receiver system, wherein the electronic processor is configured to:
        determine a vector associated with antenna positions of the antennas using Geometry Redundant Almost Fixed Solutions (GRAFS) or Geometry Extra Redundant Almost Fixed Solutions (GERAFS) to enhance integrity, and
        determine at least one of a vehicle pitch angle or a vehicle heading angle independent of an inertial reference system using the vector associated with antenna positions.

2. The system of claim 1, wherein the global navigation satellite receiver system is multi-constellation receiver.

3. The system of claim 1, wherein the vehicle is an aircraft.

4. The system of claim 1, wherein the electronic processor uses the GRAFS to calculate the vehicle heading angle and a high confidence error bound for the vehicle heading angle.

5. The system of claim 1, wherein the electronic processor uses the GERAFS to calculate the vehicle heading angle and a high confidence error bound for the vehicle heading angle.

6. A method comprising:
receiving satellite signals on a plurality of antennas at known positions on a vehicle;
determining a vector associated with antenna positions of at least two antennas of the plurality of antennas using the satellite signals according to at least one of Geometry Redundant Almost Fixed Solutions (GRAFS) and Geometry Extra Redundant Almost Fixed Solutions (GERAFS) to compute high confidence error bounds; and
determining at least one of a pitch angle or a heading angle of the vehicle based on the vector independent of an inertial reference system.

7. The method of claim 6, further comprising providing at least one of the pitch angle and the heading angle to a display or an automatic control system for the vehicle and wherein the known positions are relative positions.

8. The method of claim 6, wherein the vehicle is an aircraft.

9. The method of claim 6, wherein the antennas comprise three or more antennas.

10. The method of claim 6, wherein the vector is parallel to a central vehicle axis.

11. The method of claim 6, further comprising receiving a roll angle from an attitude heading reference unit and using the roll angle to determine the heading angle.

12. The method of claim 6, further comprising:
performing ambiguity monitoring to provide a bound to heading error.

13. The method of claim 12, wherein the ambiguity monitoring comprises checking for sudden changes in values of resolved ambiguities.

14. The method of claim 6, further comprising:
comparing a rate of change of the heading angle with a heading rate computed by an attitude heading reference unit to provide a higher confidence level.

15. The method of claim 6, further comprising:
comparing a known base line length to a base line length computed using the satellite signals.

16. One or more computer-readable storage media having instructions stored thereon, the instructions being executable by one or more processors of an aircraft to:
receive satellite signals on a plurality of antennas at known positions on a vehicle;
determine a vector associated with antenna positions of the plurality of antennas using the satellite signals according to Geometry Redundant Almost Fixed Solutions (GRAFS) or Geometry Extra Redundant Almost Fixed Solutions (GERAFS) solutions to enhance integrity; and
determine a pitch angle or a heading angle using the vector independent of an inertial reference system.

17. The one or more computer-readable storage media of claim 16, the instructions further being executable by the one or more processors of the aircraft to perform ambiguity monitoring to provide a high confidence bound for heading estimation error.

18. The one or more computer-readable storage media of claim 17, wherein the ambiguity monitoring comprises checking for sudden changes in values of resolved ambiguities.

19. The one or more computer-readable storage media of claim 16, the instructions further being executable by the one or more processors of the aircraft to compare a rate of change of the heading angle with a heading rate computed by an attitude heading reference unit to provide a higher confidence level.

* * * * *